(12) United States Patent
Bell et al.

(10) Patent No.: US 7,647,248 B2
(45) Date of Patent: Jan. 12, 2010

(54) SHOPPING ENVIRONMENT INCLUDING DETECTION OF UNPAID ITEMS IN PROXIMITY TO AN EXIT

(75) Inventors: Kevin H. Bell, Raleigh, NC (US); Eugene Michael Maximilien, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 400 days.

(21) Appl. No.: 11/016,149

(22) Filed: Dec. 17, 2004

(65) Prior Publication Data

US 2006/0136303 A1    Jun. 22, 2006

(51) Int. Cl.
*G06Q 30/00* (2006.01)
(52) U.S. Cl. ..................................... 705/26
(58) Field of Classification Search ............... 705/26, 705/27
See application file for complete search history.

(56) References Cited

U.S. PATENT DOCUMENTS

| 4,583,083 | A * | 4/1986 | Bogasky ............... 340/572.1 |
| 5,151,684 | A * | 9/1992 | Johnsen ................ 340/568.1 |
| 6,105,866 | A | 8/2000 | Morrison et al. |
| 6,382,357 | B1 * | 5/2002 | Morrison et al. ............ 186/61 |
| 6,473,739 | B1 * | 10/2002 | Showghi et al. ............. 705/26 |
| 6,540,137 | B1 | 4/2003 | Forsythe et al. |
| 6,629,135 | B1 * | 9/2003 | Ross et al. ................ 709/218 |
| 6,672,506 | B2 | 1/2004 | Swartz et al. |
| 6,920,431 | B2 * | 7/2005 | Showghi et al. ............. 705/26 |
| 2001/0049636 | A1 * | 12/2001 | Hudda et al. ............... 705/26 |
| 2005/0134449 | A1 * | 6/2005 | Barile et al. ............... 340/505 |
| 2007/0008068 | A1 * | 1/2007 | Brice et al. ............... 340/5.91 |

OTHER PUBLICATIONS

Karen Young, Los Angeles Times (pre-1997 Fulltext). Los Angeles, Calif.: Dec 23, 1988. p. 1 http://proquest.umi.com/pqdweb?did=59896276&sid=4&Fmt=3&clientId=19649&RQT=309&VName=PQD.*
"Personal Shopping System (PSS) Replacing the Cashier", Nov. 3, 2002, pp. 1-3 http://www.linkshop.com.cn/web/Article_Cinfo.aspx?ArticleID=2974.
Lin Jing, "What does the "Future Supermarket" Look Like", Scientific Consult, 2003 (13),.
China Patent office action dated Aug. 21, 2009.

* cited by examiner

*Primary Examiner*—Mila Airapetian
(74) *Attorney, Agent, or Firm*—Yee & Associates, P.C.; Jason O. Piche

(57) ABSTRACT

A shopping environment includes a server and a shopping device for broadcasting a wireless signal that identifies the identity of a shopper associated with the device. A network infrastructure conveys the wireless signal information to the server. A verification system is configured to detect the shopping device being in proximity to an exit of the shopping environment and to initiate precautionary action in response thereto. The shopping device may be enabled to permit the user to indicate purchase of an item and, responsive thereto, to communicate a purchase to the server as part of maintaining a virtual shopping cart of items selected for purchase by the shopper. The verification apparatus initiates the precautionary action if the shopper has not made payment arrangements. The verification apparatus is further enabled to display the number of items in the virtual shopping cart and the amount of time spent on the shopping trip.

9 Claims, 3 Drawing Sheets

SHOPPING ENVIRONMENT INCLUDING DETECTION OF UNPAID ITEMS IN PROXIMITY TO AN EXIT

BACKGROUND

1. Field of the Present Invention

The present invention is in the field of electronic systems and more particularly electronic systems for use in a shopping environment.

2. History of Related Art

In a conventional shopping environment, inventory shrinkage is an inevitable characteristic of doing business. Inventory shrinkage occurs through various means including theft, loss, breakage, etc. Electronically enhanced shopping environments include mechanisms for facilitating or enhancing the shopping experience by providing real time promotional materials to a shopper. It would be desirable to implement a shopping environment that addresses the issue of inventory leakage with minimal additional cost. It would be further desirable if the implemented method and solution leveraged, to the greatest extent possible, the features of an existing product. It would be still further desirable if the implemented solution leveraged the elements of the electronically enhanced shopping environment.

SUMMARY OF THE INVENTION

The identified objectives are provided by a shopping environment according to the present invention. The shopping environment includes a server and a shopping device for broadcasting a wireless signal that identifies the identity of a shopper associated with the device. A network infrastructure conveys the wireless signal information to the server. A verification system is configured to detect the shopping device being in proximity to an exit of the shopping environment and to initiate precautionary action in response thereto. The shopping device may be enabled to permit the user to indicate purchase of an item and, responsive thereto, to communicate a purchase to the server as part of maintaining a virtual shopping cart of items selected for purchase by the shopper. The verification apparatus initiates the precautionary action if the shopper has not made payment arrangements. In the case where payment arrangements have been made, the verification apparatus provides information allowing for additional visual confirmation of the purchases made. The verification apparatus is further enabled to display the number of items in the virtual shopping cart and the amount of time the shopper has been on this particular shopping trip.

BRIEF DESCRIPTION OF THE DRAWINGS

Other objects and advantages of the invention will become apparent upon reading the following detailed description and upon reference to the accompanying drawings in which.

Figure 1:
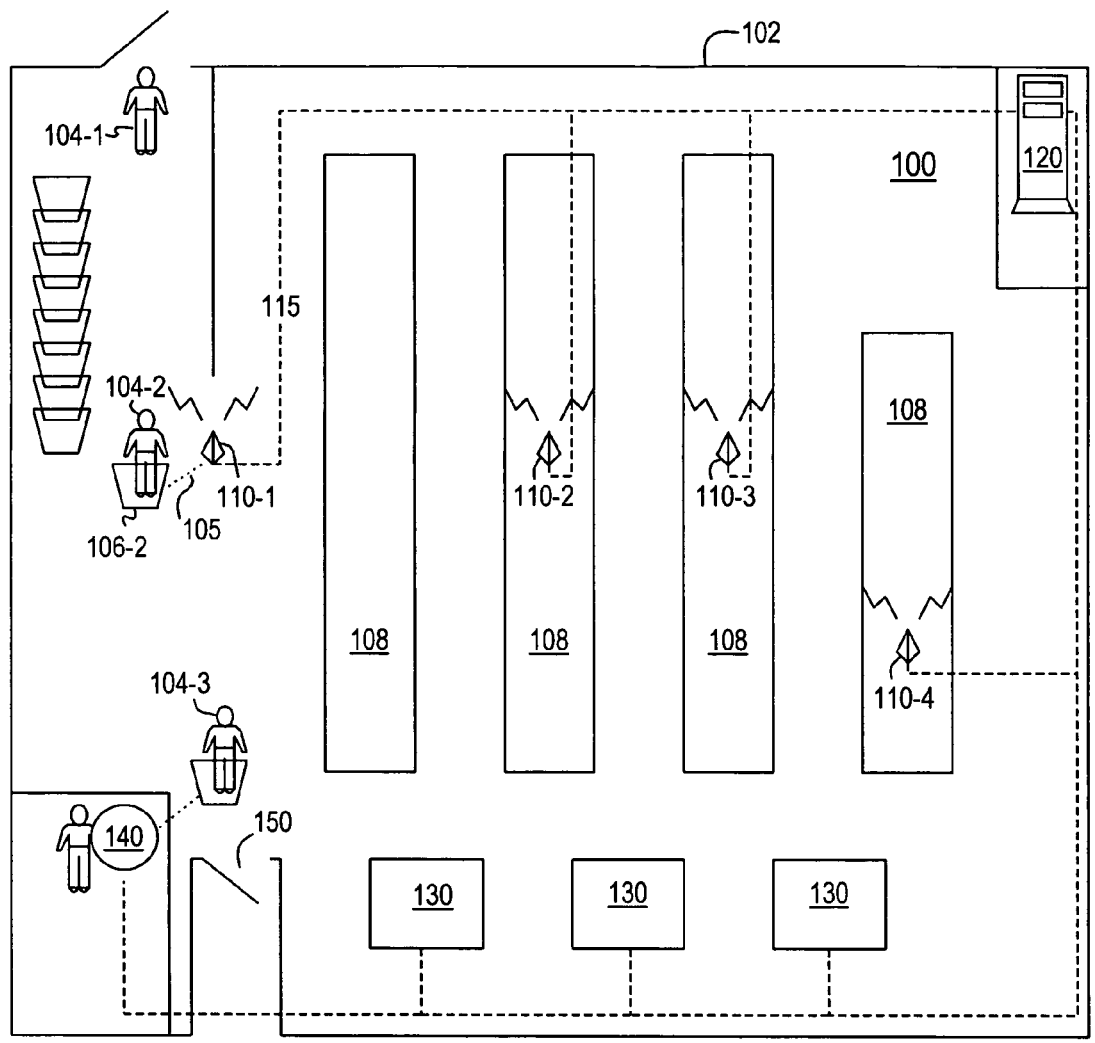
FIG. 1 is a depiction of an exemplary shopping environment according to one embodiment of the present invention.

While the invention is susceptible to various modifications and alternative forms, specific embodiments thereof are shown by way of example in the drawings and will herein be described in detail. It should be understood, however, that the drawings and detailed description presented herein are not intended to limit the invention to the particular embodiment disclosed, but on the contrary, the intention is to cover all modifications, equivalents, and alternatives falling within the spirit and scope of the present invention as defined by the appended claims.

DETAILED DESCRIPTION OF THE INVENTION

Generally speaking, the invention is directed at a shopping environment and method that facilitates the detecting of unpaid items near an exit of a store for purposes of taking precautionary action to prevent or reduce the amount of inventory shrinkage. Upon entering a store, a shopper is associated with an electronic shopping device capable of sending a wireless signal. The shopping environment includes a verification system near an exit of the store. The verification system is able to receive the signal sent by the shopping device. When a verification system detects such a signal, the verification system, in conjunction with a server that maintains information about each shopper in the store, determines what items are added to the shopper's shopping cart and whether the shopper has made payments arrangements. Personnel are alerted to take precautionary action when a shopper with unpaid items approaches the exit.

Turning now to the drawings, FIG. 1 is a representation of an exemplary shopping environment 100 according to one embodiment of the present invention. In the depicted embodiment, shopping environment 100 includes a physical building or store 102 containing items for purchase. Shoppers indicated by reference numerals 104-1 through 104-3 (generically or collectively referred to herein as shopper(s) 104) enter the store 102 and purchase items displayed on shelving 108.

Shopping environment 100 preferably incorporates electronic shopping features that enhance the shopping experience for shoppers 104. Electronic shopping may include the ability to purchase items "virtually" by indicating a purchase decision using a mobile or wireless electronic device. These devices, which may be mounted on a conventional shopping cart or carried by the shopper, are referred to in this disclosure as shopping devices 106. In the depicted implementation of shopping environment 100, shopper 104 acquires a shopping device 106 as they enter store 102. As illustrated in FIG. 1, for example, shopper 104-1 is shown immediately after entering store 102 and shopper 104-2 is shown after obtaining a shopping cart equipped with a shopping device 106.

Shopping environment 100 includes a networking infrastructure that enables the shopping devices 106 to communicate with a server 120. The infrastructure depicted in FIG. 1 includes wireless portions and wired or wireline portions. Specifically, the networking infrastructure of shopping environment 100 includes one or more wireless access points 110-1 through 110-4 (generically or collectively referred to herein as wireless access point(s) 110). Wireless access points 110 are enabled to communicate with mobile or wireless electronic devices including the shopping devices 106. Each wireless access point is also connected to a wireline portion 115 (shown as a dashed line in FIG. 1) of the networking infrastructure.

The wireless and wireline portions of the networking infrastructure may comply with various network standard protocols. Wireless access points 110 may, for example, receive and/or transmit wireless communications (indicated in FIG. 1 by reference numeral 105 and the corresponding dotted line) that comply with Bluetooth or WiFi standards including IEEE 802.11a, 802.11b, and 802.11g. The wireline portion 115 of the networking infrastructure may be compliant with an Ethernet (IEEE 802.3) standard.

Shopping environment 100 is arranged to facilitate electronic monitoring of shoppers 104 during their respective shopping experiences. The first shopper 104-1 is shown in FIG. 1 having just entered store 102. Store 102 is designed to enable shopper 104-1 to obtain a shopping cart and shopping device combination (which will be referred to hereafter simply as shopping device 106) immediately upon entering the store. In the illustrated implementation, a second shopper 104-2 is shown after he/she has obtained a shopping device 106 and is exiting the entry area of store 102.

Store 102 includes a wireless access point 110-1 in close proximity to the entry area. When shopper 104-2 leaves the store entry area and passes by wireless access point 110-1, a wireless communication is transmitted between shopping device 106-2 and wireless access point 110-1. This wireless communication is identified in FIG. 1 by reference numeral 105. In one embodiment, wireless communication 105 is transmitted from shopping device 106-2 to wireless access point 110-1 and includes information capable of uniquely identifying shopper 104-2.

Figure 2:
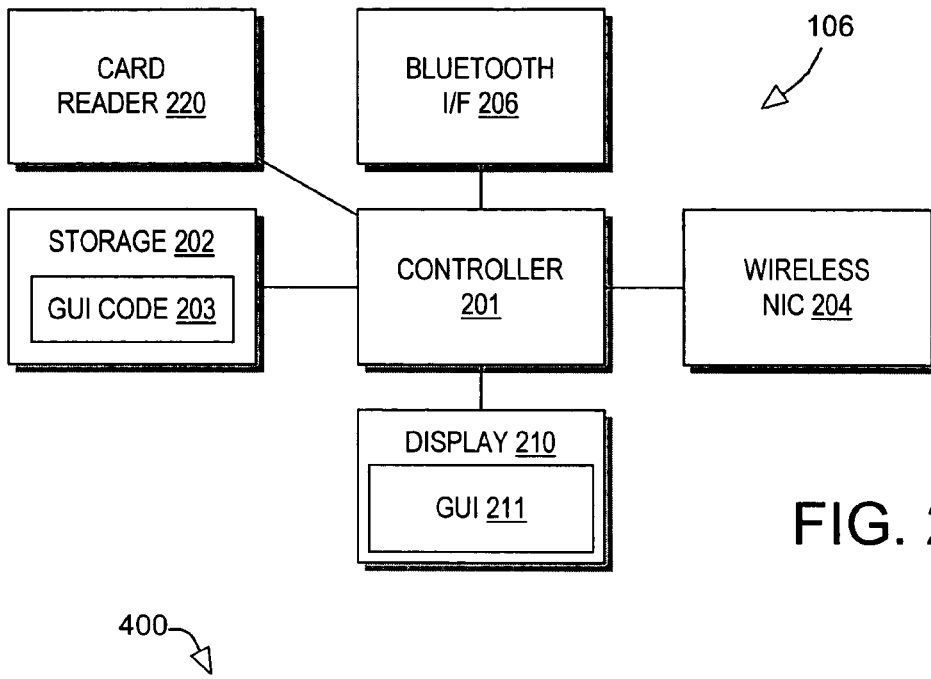
FIG. 2 is a block diagram of selected elements of a shopping device according to one embodiment of the present invention.

Each shopping device 106 associates with its corresponding shopper 104 when the shopper acquires the shopping device 106 and logs in using the shopper's frequent shopping card (for example). Referring momentarily to FIG. 2, selected elements of an exemplary shopping device 106 are shown. In the depicted embodiment, shopping device 106 includes a controller or other form of microprocessor 201 that has access to a storage facility 202. Storage facility 202 may include nonvolatile storage, such as a flash memory device, on which microcode or other software executable by controller 201 is stored. Storage facility 202 may also include volatile scratch memory (DRAM, for example) useable by controller 201 as it executes programs.

The depicted embodiment of shopping device 106 also includes a display screen 210 and one or more wireless interfaces includes a wireless network communication device (NIC) 204 capable of transceiving WiFi signals and a Bluetooth interface 206 capable of transceiving Bluetooth compliant signals. Operating code (stored in storage 202) for controller 201 may include graphical interface user (GUI) code 203 for displaying a GUI 211 on display 210. In this embodiment, the GUI 211 and the wireless capability of shopping device 106 may enable various shopping enhancing features. Promotional messages informing the shopper of discounted items, special sales, and the like, may be presented to the shopper. In addition, the shopping device may permit the shopper to indicate certain purchasing decisions and/or payment decisions. With regards to purchasing or otherwise making payment arrangements for items in a shopper's cart, the depicted embodiment of shopping device 106 includes a card reader 220 that may be used for accepting a shopper's credit card or loyalty card when the shopper is ready to check out.

The card reader 220 may also be used as part of the association process between a shopper 104 and the corresponding shopping device 106 when the shopper enters the store. Card reader 220 may be implemented as a magnetic stripe reader (MSR) or as a scanner that scans, for example, a bar code on the shopper's loyalty card. The user may swipe or scan a loyalty card with card reader 220 upon obtaining a shopping device 106. In this case, shopping device 106 is aware of the shopper's identity. In cases where the shopper does not have or does not wish to use a loyalty card, shopping device 106 may simply generate or issue a unique number for the purpose of distinguishing the corresponding shopper from the other shoppers already present in the store.

Returning to FIG. 1, the depicted embodiment of shopping environment 100 includes a server 120 connected to the wireline 115 of the networking infrastructure. Server 120 preferably maintains data relevant to store 102. Server 120 may, for example, maintain an inventory of items in stock as well as a customer database that may include information such as contact information for its customers, the historical purchases of those customers, and customer-provided profile or preference information. In one embodiment, server 120 also maintains a list of active shoppers 104. An active shopper is a shopper 104 who has associated with a shopping device 106, but has yet made payment arrangements. As indicated above, the list of active shoppers 104 may identify shoppers who have a loyalty card personally while identifying others uniquely, but anonymously, with an alphanumeric identifier.

When a shopper makes payment arrangements for the items in his/her shopping cart, a communication is sent to server 120. In cases where payment is made when the shopper 104 uses card reader 220 on shopping device 106 to swipe a credit card, the communication may be sent from shopping device 106 to server 120 via one of the wireless access points 110. In other cases where a shopper 104 checks out or makes payment arrangements in a more traditional manner, the communication to the server may originate from a network-connected checkout stand or cash register 130.

Server 120 responds to the communication indicating payment as being made by updating its list of shoppers who are currently shopping. In some implementations, server 120 may also store a list of the items in the shopping cart as well as the amount of time spent on the current shopping trip for a shopper who has paid. This list of items may be generated during checkout when the items are being scanned or otherwise processed. Alternatively, the list of shopping cart items may be stored and updated on shopping device 106 and transmitted to server 120 upon payment. In this embodiment, a shopper 104 will use shopping device 106 to enter items into the (electronic) shopping cart as they are selected during shopping. Thus, information indicating that a particular shopper has paid for items in the shopping cart is maintained either on server 120, shopping device 106, or both. This information is referred to herein as shopping completion information.

The present invention uses the shopping completion information beneficially to reduce the occurrence of intentional and unintentional inventory shrinkage in store 102. The shopping environment 100 depicted in FIG. 1 includes a verification system 140 to facilitate this objective. Verification system 140 is configured to alert its user, preferably an employee of or a security office for store 102, when a shopping cart with unpaid items is detected in proximity to an exit 150 of the store. Verification system 140 could also alert its user when a paid shopping cart is approaching exit 150 of the store. Along with the alert, the employee or security would receive shopping completion information concerning the number of items purchased and the amount of time spent on the shopping trip. This would provide extra shrinkage (and/or theft) protection by allowing visual comparison of the shopper's actual cart to the virtual cart, where the user(s) of the system could take precautionary action if suspicious differences appear evident. In the depicted illustration, for example, store 102 includes only a single exit 150 and verification system 140 is positioned close thereto. Verification system 140 includes a wireless receiver or transceiver that is capable of receiving a wireless signal transmitted by shopping device 106, whether the transmitted signal is a WiFi signal, a Bluetooth signal, or some other type of signal. In the preferred embodiment, the wireless portion of the network infrastructure of shopping environment 100 has limited range, where the range refers to the maximum distance that a wireless signal transmitted by a shopping device 106 is detectable. In one embodiment, for example the wireless range of shopping environment 100 is less than approximately 10 feet. The range of the wireless signal may be controlled by intentionally limiting the strength of the signal produced by a shopping device 106.

The limited range wireless signal of the preferred embodiment is desirable for the location information conveyed by the signal. Specifically, detection of a wireless signal having a range of less than ten feet, for example, conveys not only the content of the wireless signal, but also information about the location of the transmitting device (i.e., the transmitting device must be within a ten foot radius). The invention leverages the location information conveyed by short-range wireless signals to provide a mechanism for detecting a shopper in a specific area or location of the store (such as a location near a store exit).

Verification system 140 is enabled to retrieve or receive the shopping completion information. Verification system 140 may receive the shopping completion information from server 120 or from shopping device 106. In either case, verification system 140 uses the shopping completion information, together with its ability to detect the presence of shopping carts positioned close to it, to screen the shoppers who are close to the exit 150.

If verification system 140 is unable to retrieve or receive any shopping completion information corresponding to a shopping cart 106 positioned close to exit 150, verification system 140 generates an alert or other suitable form of warning that will be detectable by its user. Upon receiving an alert from verification system 140, the personnel may then stop or delay the shopper from leaving the store. In other embodiments, verification system 140 may also work in conjunction with features of store 102 to take other forms of precautionary action. Verification system 140 may, for example, initiate some form of electronic warning (such as an audible signal) that would be detectable by anyone in proximity to the door. Verification system 140 may also cause the activation of a lock for exit 150 in response to detecting a shopping cart containing unpaid items in close proximity to exit 150. By maintaining shopping completion information and a verification system such as verification system 140, the present invention provides a mechanism to anticipate theft or other activity that may result in shrinkage and enables the users of the system to take precautionary actions. Portions of the present invention may be implemented as a set or sequence of computer executable instructions (software) that is stored on a computer readable storage medium. The storage medium may be a persistent storage medium such as a hard disk, a floppy diskette, magnetic tape, flash memory device, or the like. During execution of the instructions, the storage medium may be a volatile storage medium such as a system memory or cache memory. In addition, the instructions may be consolidated on a single system or distributed over two or more systems. In the latter case, a first data processing system may execute some portions of the instructions while a second system executes other potions of the program. In either case, the instructions when executed, effect a method of reducing shrinkage in a shopping environment according to the present invention.

Figure 3:
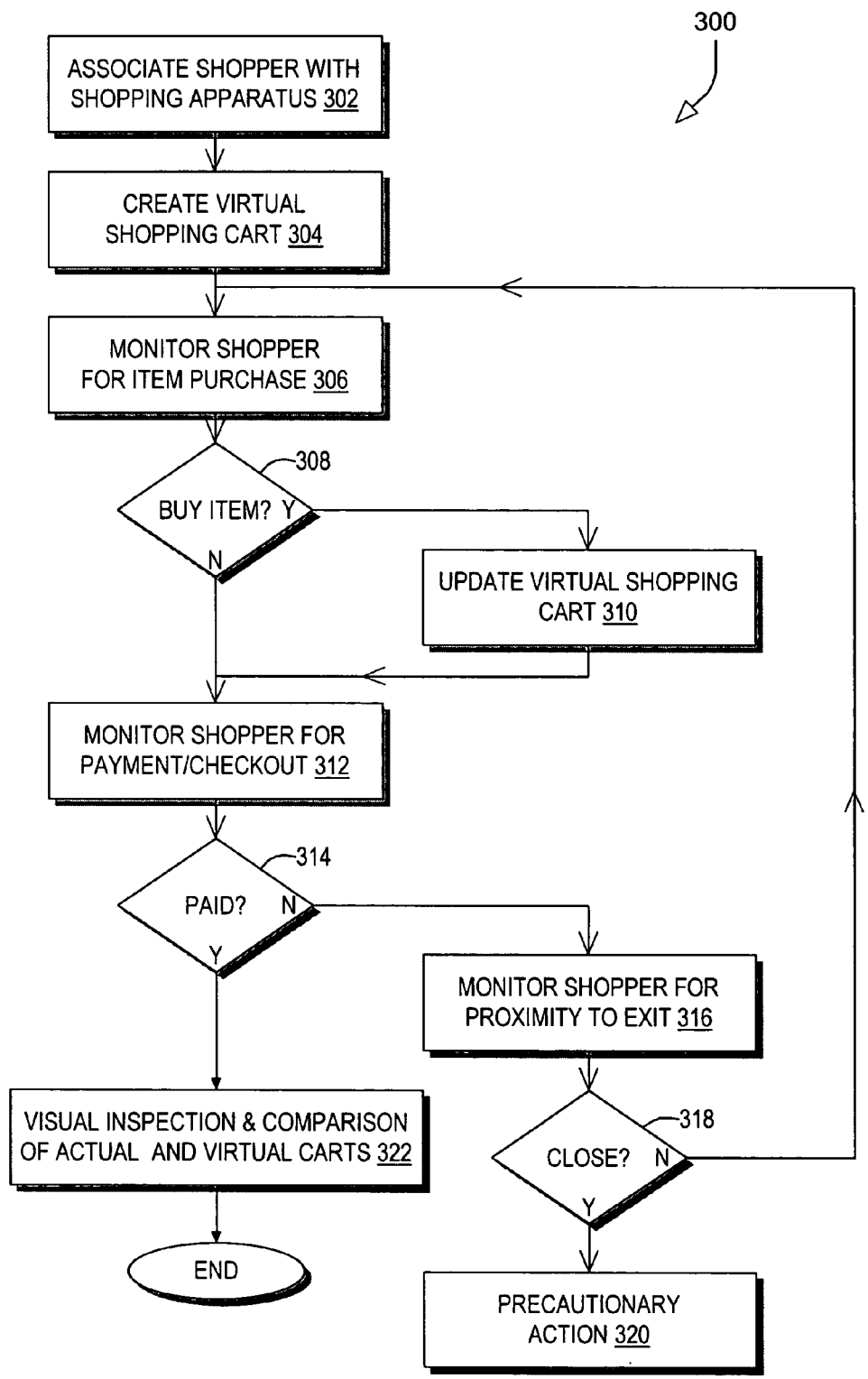
FIG. 3 is a flow diagram of a method of detecting the presence of unpaid items in proximity to an exit according to one embodiment of the present invention.

Turning now to FIG. 3, an exemplary such method 300 of reducing shrinkage is depicted. The depicted embodiment of method 300 includes associating (block 302) a shopper with a shopping apparatus or shopping device such as the shopping device 106 of FIG. 1. The association may be personal for shoppers possessing loyalty cards or other means for identifying themselves. In other cases, the association may be anonymous, such as when a shopper without a loyalty card enters store 102.

In the depicted embodiment of method 300, the association between a shopper and a shopping device causes the creation (block 304) of a virtual shopping cart. The virtual shopping cart created is an electronic representation of the items present in a particular physical shopping cart. The virtual shopping cart may be maintained on shopping device 106 itself or on a store server 120. The virtual shopping cart may be updated dynamically through the use of shopping device 106. In this implementation, the shopper indicates each item that he/she wishes to purchase at the time when the item is placed in the physical shopping cart. In other implementations, the virtual shopping cart may not be updated until the shopper makes payment arrangements for the items.

In the embodiment of method 300 depicted in FIG. 3, the virtual shopping cart is updated dynamically. For this implementation, method 300 enters a monitoring mode after creating the association between a shopper and a shopping device and creating the virtual shopping cart. In this monitoring mode, method 300 includes monitoring (block 306) the shopper to determine if a purchase is made. In one embodiment, the shopper may indicate purchasing decisions through graphical interactions with shopping device 106.

If a shopper decides (block 308) to purchase an item, the virtual shopping cart is updated (block 310) to include the most recently selected item. In addition, method 300 includes monitoring block 312 for payment by the shopper. If the shopper has not paid for the shopping cart items (block 314), method 300 includes monitoring (block 316) to detect the shopper in proximity to a store exit. If, on the other hand, the shopper has paid for items in the virtual shopping cart, the cart could then be visually monitored (block 322) by store employee(s) and/or security to detect differences between the items in the actual shopping cart and the items in the virtual cart, noting the time spent in the store as well. This visual inspection and comparison provides an additional measure of security to the system.

In the event that method 300 detects (block 318) a shopping device corresponding to an unpaid shopping cart in proximity to a store exit, method 300 includes initiating (block 320) some form of precautionary action. The precautionary action that may be taken may include generating a precautionary or warning message on a verification system manned by a security officer or other store employee. The security officer may then remind the shopper that payment has not been completed or prevent the shopper from leaving the store. In other embodiments, the precautionary action could include generating some form of audible alarm to alert the shopper and store personnel that there are unpaid items in the shopping cart. In addition, the precautionary action 320 may include activating a locking mechanism for exit 150 that would prevent shoppers from exiting the store.

As indicated above, the creation and maintenance of a virtual shopping cart is an implementation specific feature. In other embodiments, method 300 may include simply updating the verification system when a new shopper association is created and updating the verification system when payment is received from a shopper. In this implementation, the verification system would initiate precautionary action if an active shopper (a shopper that has been associated with a shopping device but who has not made payment arrangements) is detected in proximity to an exit without ever having knowledge of the items in the shopping cart. This implementation might be desirable for its relative simplicity and expense.

In embodiments of shopping environment 100 where virtual shopping carts are created and maintained, precautionary action might also be initiated when a security personnel person or other employee is able not only to determine when an active shopper is close to an exit, but also to determine what items or at least the number of items within a particular shopping cart have been paid for. In this embodiment, a copy of the virtual shopping cart or an indication of the number of items purchased is sent to the verification system each time it is updated or upon payment by the shopper. In this case, the verification system will alert the security officer even when a paid-for shopping cart is detected in proximity to the exit. The security officer is then able to compare the items in the physical shopping cart with the items indicated on the virtual shopping cart, while noting also the amount of time the shopper has been on this shopping trip. This implementation beneficially prevents a customer from adding unpaid items to the physical shopping cart after making payment arrangements for the other items.

Figure 4:
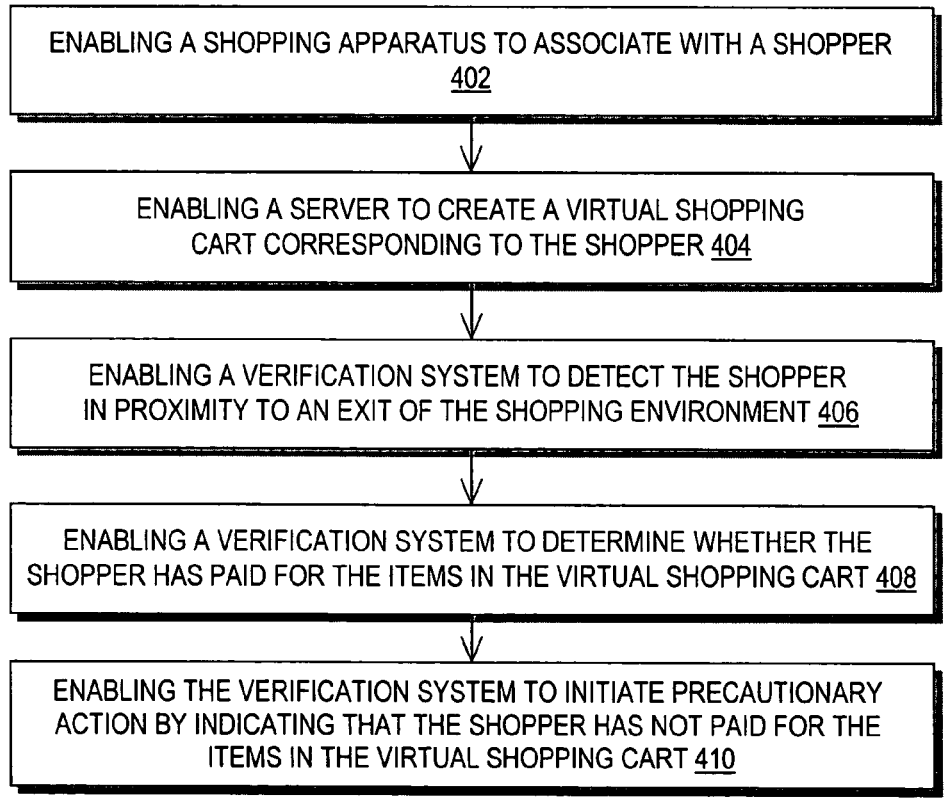
FIG. 4 is a flow diagram of a service for enabling a shopping environment according to one embodiment of the present invention.

In another embodiment, the invention constitutes a service for or method of implementing a shopping environment such as shopping environment 100. The service embodiment is applicable to service providers that enable or facilitate the creation of a shopping environment such as shopping environment 100. An exemplary such service is represented by the flow diagram of FIG. 4. In this embodiment, a service 400 includes enabling (block 402) a shopping device such as shopping device 106 to associate with a shopper. This may include providing the shopping device 106, the software that controls the shopping device, or both.

In the depicted embodiment of service 400, the service provider also provides or enables (block 404) a server to create a virtual object in response to an association between a shopper and a shopping device. The service provider may also provide or enable (block 406) a verification system, such as the verification system 140, to detect a shopper in the vicinity of an exit to the shopping environment. As described above, one embodiment of the invention uses limited range wireless technology. In this embodiment, verification system 140 is able to detect a system in proximity to an exit by placing the verification system 140 proximal to the exit. In this embodiment, verification system 140 does not require any additional hardware or software to determine the location of a detected signal. Instead, mere reception of a signal by verification system 140 is sufficient to conclude that the transmitting device is within a specified and preferably variable range.

The service provider also ensures that the verification system of the present invention is enabled to determine whether a shopper has paid for or made payment arrangements for the items in the shopper's shopping cart. In an embodiment that uses virtual shopping carts, for example, the verification system is enabled to determine whether the virtual shopping cart corresponding to a particular shopper (i.e., a shopper that is in proximity to an exit) has been paid for. The verification system may determine this from shopping completion information provided by the server 120 or the shopping device 106.

The service provider also enables (block 410) the verification system to initiate precautionary action in response to detecting an active shopper (shoppers who have not yet made payment arrangements for the items in their baskets) in the vicinity of a store exit. As described earlier, the precautionary action may include informing a security officer, generating an audible signal, or even automatically locking a store exit.

Those skilled in the field of the present invention will recognize that this disclosure would enable one to make or use an electronically based shopping environment. It is understood that the form of the invention shown and described in the detailed description and the drawings are to be taken merely as presently preferred examples. It is intended that the following claims be interpreted broadly to embrace all the variations of the preferred embodiments disclosed.

What is claimed is:

1. A method in a data processing system for reducing inventory shrinkage in a shopping environment, the method comprising:
    receiving a wireless signal from a shopping device capable of detecting unpaid items, wherein the wireless signal contains information indicative of an identity of a shopper associated with the shopping device;
    responsive to a first determination by the data processing system that the shopping device is in proximity to an exit of a store, determining if an unpaid item is associated with the shopping device; and
    responsive to both the first determination that the unpaid item is associated with the shopping device and a second determination that the shopping device is in proximity to the exit, alerting store personnel to take a precautionary action, further comprising displaying a virtual shopping cart on a display screen of the shopping device responsive to said detecting of the shopper in proximity to the exit.

2. The method of claim 1, wherein the shopping device comprises a controller, storage that includes code executable by the controller, a graphical display that is operable for presenting a graphical user interface to the shopper associated with the shopping device, and a wireless network communication transceiver device that is operable for broadcasting the wireless signal.

3. The method of claim 2 wherein the wireless network communication device broadcasts a limited range wireless signal such that a location of the shopper is ascertainable using a plurality of wireless access points located within the shopping environment.

4. The method of claim 3, further comprising steps of:
    identifying, by the shopper using the shopping device, the identify of the shopper; and
    identifying, by the shopper using the shopping device, a purchasing decision with respect to at least one item offered for sale in the shopping environment.

5. The method of claim 4, further comprising a step of transmitting, by the shopping device, shopping completion information to a server responsive to the shopper making payment arrangements using the shopping device, wherein the shopping completion information that is transmitted to the server by the shopping device comprises a list of items in the virtual shopping cart.

6. The method of claim 2, further comprising steps of:
    identifying, by the shopper using the shopping device, the identify of the shopper; and
    identifying, by the shopper using the shopping device, a purchasing decision with respect to at least one item offered for sale in the shopping environment.

7. The method of claim 6, further comprising a step of transmitting, by the shopping device, shopping completion information to a server responsive to the shopper making payment arrangements using the shopping device, wherein the shopping completion information that is transmitted to the server by the shopping device comprises a list of items in the virtual shopping cart.

8. The method of claim 1, further comprising steps of:
  identifying, by the shopper using the shopping device, the identify of the shopper; and
  identifying, by the shopper using the shopping device, a purchasing decision with respect to at least one item offered for sale in the shopping environment.

9. The method of claim 8, further comprising a step of transmitting, by the shopping device, shopping completion information to a server responsive to the shopper making payment arrangements using the shopping device, wherein the shopping completion information that is transmitted to the server by the shopping device comprises a list of items in the virtual shopping cart.

* * * * *